June 15, 1965     J. F. O'HARA     3,188,806
SUPPORT FOR REACTION MOTOR
Filed March 6, 1963

Janvier F. O'Hara,
*INVENTOR.*

3,188,806
SUPPORT FOR REACTION MOTOR
Janvier F. O'Hara, Sierra Madre, Calif., assignor, by mesne assignments, to the United States of America as represented by the Secretary of the Army
Filed Mar. 6, 1963, Ser. No. 263,684
3 Claims. (Cl. 60—35.6)

The present invention relates to a support structure for the reaction motor of a missile.

In the past much difficulty has been encountered in mounting the reaction motors of missiles in a manner which would provide suitable strength and compactness and yet keep weight to a minimum.

The reaction, or thrust, of a reaction motor installed in a rocket must be carried from the motor into the cylindrical walls of the propellant tank of the rocket; the axes of the motor and tank are in line for this purpose.

The propellant tank has walls of a thickness capable of carrying the loads imposed under operational conditions. The manner in which these loads are applied is important, since parts of the tank receiving cencentrated stress require additional reinforcement which, consequently, adds weight.

Conventionally, a tubular truss has been connected to and between the motor and tank as a means of carrying the motor thrust into the tank shell. In a rocket having very thin propellant tank walls, such a tubular truss is not functionally suitable, since the truss transmits the motor thrust to the tank end, causing a buckling of the shell, unless considerable shell reinforcement is used to diffuse the load more evenly.

One object of this invention is to connect the reaction motor of a rocket to a conoidal shaped supporting means which distributes the motor thrust load to the cylindrical walls of the rocket propellant tank in a manner whereby the tank wall is evenly loaded or stressed completely around its circumference.

Another object is to provide a support so designed as to give maximum strength with a minimum of weight and size.

Still another object is to provide a support which is particularly suitable for mounting a steerable rocket motor.

A further object is to provide a motor support which will also act as a wall portion of the propellant tank.

Another object is to provide a motor support which will inherently direct fuel into the motor.

These and other objects and advantages of the present invention will become apparent from the following description taken in conjunction with the accompanying drawings, wherein.

Figure 1:
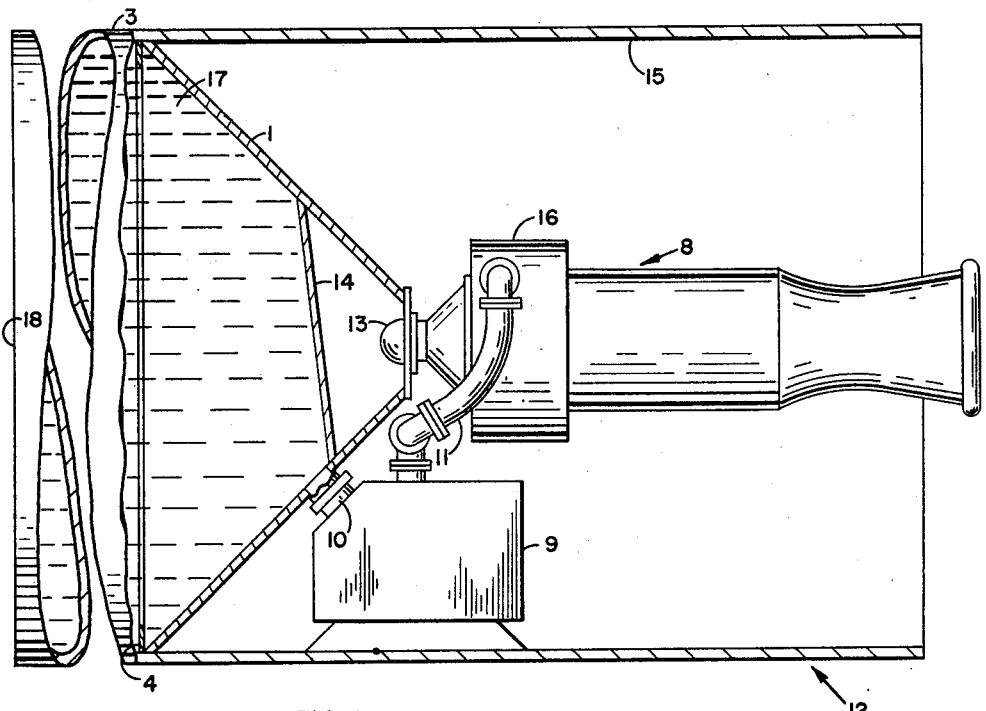
FIGURE 1 is an elevational view of a missile partially cut away so as to illustrate the motor support means.

Referring now to FIGURE 1, element 1 is a conoidal shaped support means for mounting reaction motor 8 to a missile body 12. This missile body is comprised of two portions, 15 and 3. Portion 15 forms a motor enclosure and portion 3 serves dual purposes in that it acts as a part of the missile body as well as forming the cylindrical wall of the missile propellant tank. A forward portion of the missile body located at the termination of the propellant tank is indicated at 18. A base ring 4 serves to reinforce the missile body at the point of connection between the missile body and support cone 1. Support element 1 is shown to have a frusto-conical configuration and forms the rear wall of the missile's propellant tank and serves as a mount for reaction motor 8. A turbo pump 9 is mounted on the missile wall 15 adjacent support element 1 and is connected to the support element by intake conduit 10. A deflector plate 14 is located adjacent the apex of the frusto-conical support element. The deflector plate directs the flow of fuel into the intake 10 of turbo pump 9 and also serves to reinforce the support element. The propellant is fed from the turbo pump through the flexible connector line 11 then through propellant valve assembly 16 and finally into reaction motor 8. It will be noted that the reaction motor is pivotally attached to support element 1 by means of a ball joint connection 13. The purpose of ball joint 13 is to allow the reaction motor to be placed at various angles relative to the longitudinal axis of the missile body thus providing a steering means for the missile. Since it forms no part of the present invention the steering apparatus normally attached to the reaction motor is not illustrated in the drawings.

Figure 2:
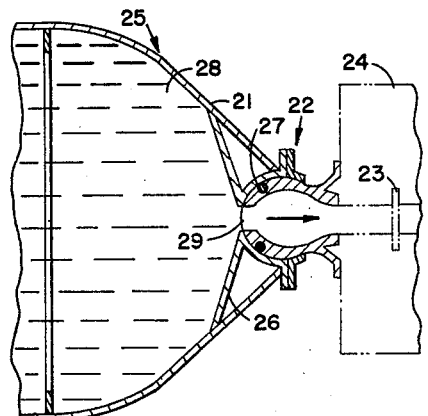
FIGURE 2 is a sectional view illustrating another form of the invention in which propellant is fed directly through a ball joint motor connection.

Referring now to FIGURE 2, it will be noted that element 25 is generally in the form of a paraboloid having an opening at the apex thereof and is substantially similar to support element 1 illustrated in FIGURE 1. The frusto-conical support element illustrated in FIGURE 1 has proved to be an exceptionally rigid motor support as well as a dependable fuel tank wall. However, in some instances excessive pressures in the fuel tank have caused bulging of the support. When extreme pressures are anticipated it has been found desirable to utilize a support having substantially an ogival cross-sectional configuration, which has been found to be capable of withstanding such pressures without appreciable deflection.

The device of FIGURE 2 further differs from that of FIGURE 1 in that the propellant is fed from the high pressure tank directly through the hollow ball joint assembly 22 before passing through propellant valve 23 and into the reaction motor. An annular dished deflection plate 26 is provided for directing flow of the propellant into the ball joint opening 29. Plate 26 is mounted intermediate the apex of the conoidal wall and the juncture of the conoidal wall and outer cylindrical portion 3. In addition to directing propellant flow, the deflection plate 26 serves as part of ball joint assembly 22 and also provides reinforcement to the propellant tank wall. Element 27 is an O ring seal to prevent the leakage of propellant through the ball joint. A housing 24 surrounds the main body of the reaction motor. Details of the housing are omitted for clarity.

Figure 3:
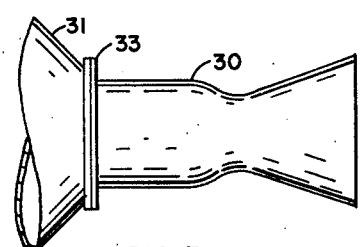
FIGURE 3 is an elevational view illustrating another form of the invention in which the reaction motor is connected directly to the cone without the use of a ball joint.

FIGURE 3 illustrates a support element similar to that shown in FIGURE 1 wherein it will be noted that the reaction motor 30 is rigidly attached by a flange connection 33 to support 31 whereas the motor and cone of FIGURE 1 are pivotally interconnected.

In operation the use of the frusto-conical or paraboloid shaped motor support has proved to be extremely efficient in that the need for a separate wall and support is eliminated thus reducing the cost, the weight and the complexity of the system. Further, because of the even distribution of the thrust load to the missile body (propellant tank) a substantial reduction of materials and weight is made possible in these sections of the missile. Because of the geometric shape, each of the illustrated supports has proved to be stronger than those previously used. Operation of missiles containing the present invention has also demonstrated improved fuel feeding characteristics. The reason for this is also found in the geometric configurations of the supports. Since each support is shaped substantially like a funnel it will be seen that as the missile is accelerated the propellant will be directed to the tank outlet by the tapered walls of the support. Further, motor thrust upon the conoidal tank structure may, all or in part, be cancelled by an opposite reaction provided by internal pressure within the tank.

While the foregoing is a description of the preferred embodiment, the following claims are intended to include those modifications and variations that are within the spirit and scope of my invention.

The following invention is claimed:

1. In a rocket propulsion system including a motor, a propellant tank including a mounting assembly for said motor, said propellant tank having a generally conoidal wall at one end thereof, a flat plate forming a wall at the other end of said propellant tank, a cylindrical body portion connecting said walls and forming the outer shell of the rocket, said motor being connected to the apex of said conoidal wall for distributing motor thrust loads therethrough to said cylindrical walls, passage means disposed in communication with said propellant tank and said motor for directing propellant flow thereto, said passage means connected to the side of said conoidal wall intermediate the apex thereof and said cylindrical body portion, a plate mounted in said conoidal wall and extending across said tank in a plane inclined to the axis of said cylindrical portion of said tank, the lower most portion of said inclined plate being secured to said conoidal wall at a point beneath said passage means for directing propellant flow thereto and said plate further disposed for reinforcing said conoidal wall.

2. In a rocket propulsion system including a motor, a propellant tank including a mounting assembly for said motor, said propellant tank having a generally conoidal wall at one end thereof, a flat plate forming a wall at the other end of said propellant tank, a cylindrical body portion connecting said walls and forming the outer shell of the rocket, said motor being connected to the apex of said conoidal wall for distributing motor thrust loads therethrough to said cylindrical walls, a ball-joint assembly connected to said propellant tank and said motor for pivotal support thereof, a plate mounted interiorly of said conoidal wall, said plate including a first reinforcing and propellant directing portion extending inwardly from said conoidal wall in angular relation with the axis of said cylindrical body portion and a second spherical portion extending outwardly to said conoidal wall and forming a spherical bearing surface as part of said ball-joint assembly, the ball of said ball-joint being mounted on said motor and retained in said spherical bearing surface for the pivotal movement, passage means disposed in said ball-joint assembly in communication with said propellant tank and said motor and cooperating with said first reinforcing and propellant directing portion of said plate to direct propellant to said motor.

3. A device as in claim 2 wherein said said first reinforcing and propellant directing portion of said plate is provided with an annular dish shaped configuration having a central opening therethrough and said plate is disposed in said conoidal wall in coaxial relation therewith, said central opening coacting with an aperture the ball portion of said ball-joint assembly to define said passage means.

References Cited by the Examiner
UNITED STATES PATENTS

| | | | |
|---|---|---|---|
| 2,424,897 | 7/47 | Orshansky. | |
| 2,634,577 | 4/53 | Halford et al. | 60—35.6 |
| 3,010,279 | 11/61 | Mullen et al. | 60—35.6 X |
| 3,016,697 | 1/62 | Sternberg et al. | 60—35.6 |
| 3,069,851 | 12/62 | Tumavicus | 60—35.6 X |
| 3,073,630 | 1/63 | Kuhn | 60—35.55 X |
| 3,121,392 | 2/64 | Economou et al. | 60—35.6 X |

SAMUEL LEVINE, *Primary Examiner.*